(12) United States Patent
Hishikawa

(10) Patent No.: US 9,107,280 B2
(45) Date of Patent: Aug. 11, 2015

(54) ANODE ROTATIONAL DRIVE DEVICE AND X-RAY IMAGING APPARATUS

(75) Inventor: Shingo Hishikawa, Tokyo (JP)

(73) Assignee: HITACHI MEDICAL CORPORATION, Tokyo (JP)

( * ) Notice: Subject to any disclaimer, the term of this patent is extended or adjusted under 35 U.S.C. 154(b) by 279 days.

(21) Appl. No.: 13/988,769

(22) PCT Filed: Nov. 30, 2011

(86) PCT No.: PCT/JP2011/077599
§ 371 (c)(1),
(2), (4) Date: May 22, 2013

(87) PCT Pub. No.: WO2012/073983
PCT Pub. Date: Jun. 7, 2012

(65) Prior Publication Data
US 2013/0243161 A1    Sep. 19, 2013

(30) Foreign Application Priority Data

Dec. 2, 2010    (JP) ................. 2010-269467

(51) Int. Cl.
| | | |
|---|---|---|
| H05G 1/18 | (2006.01) |
| H01J 35/10 | (2006.01) |
| G08C 19/46 | (2006.01) |
| G08C 19/48 | (2006.01) |
| H02P 3/20 | (2006.01) |
| H02P 4/00 | (2006.01) |
| H02K 37/08 | (2006.01) |
| H05G 1/66 | (2006.01) |
| H01H 33/59 | (2006.01) |
| H05G 1/10 | (2006.01) |

(52) U.S. Cl.
CPC .................. *H05G 1/66* (2013.01); *G08C 19/46* (2013.01); *G08C 19/48* (2013.01); *H01H 33/593* (2013.01); *H01J 35/10* (2013.01); *H02K 37/08* (2013.01); *H02P 3/20* (2013.01); *H02P 4/00* (2013.01); *H05G 1/10* (2013.01)

(58) Field of Classification Search
CPC .......... H01J 35/00; H01J 35/02; H01J 35/04; H01J 35/08; H01J 35/10; H01J 35/101; H01J 35/103; H01H 33/36; H01H 33/44; H01H 33/59; H01H 33/593; H02K 7/18; H02K 7/1807; H02K 7/1853; H02K 37/00; H02K 37/02; H02K 37/04; H02K 37/08; H02M 1/00; H02M 1/4233; H02M 2001/0003; H02M 2005/2932; H02M 2005/2935; H02M 2005/2937; H02P 1/00; H02P 1/16; H02P 1/24; H02P 1/26; H02P 3/00; H02P 3/18; H02P 3/20; H02P 4/00; H02P 6/005; H02P 9/08; H02P 11/00; H02P 11/06; H02P 25/16; H02P 25/18; H02P 27/00; H02P 27/04; H02P 27/05; H02P 27/06; H02P 27/08; H02P 27/085; G05B 11/00; G05B 11/26; G05B 11/28; G05B 13/00; G05B 13/02; G05B 13/0205; G05B 13/021; G05B 13/022; G05B 13/0225; G05B 13/024; G05B 13/025; G08C 19/00; G08C 19/02; G08C 19/12; G08C 19/16; G08C 19/38; G08C 19/46; G08C 19/48; H05G 1/08; H05G 1/10; H05G 1/18
USPC ............ 378/93, 114, 143, 144; 323/212, 217; 310/40 R, 46, 66, 68 R, 68 D, 159–162; 318/686, 34, 53, 66, 85, 400.2, 400.09, 318/400.1, 400.13, 400.14, 400.26, 255, 318/268–275, 521, 533–535
See application file for complete search history.

(56) References Cited

U.S. PATENT DOCUMENTS

| | | | |
|---|---|---|---|
| 4,829,551 A | | 5/1989 | Resnick et al. |
| 2008/0150455 A1* | | 6/2008 | Shinmura et al. ............... 318/85 |
| 2011/0260656 A1* | | 10/2011 | Kazama et al. ................. 318/85 |
| 2012/0038296 A1* | | 2/2012 | Jiang ....................... 318/400.02 |

FOREIGN PATENT DOCUMENTS

| | | |
|---|---|---|
| JP | 57-020176 | 2/1982 |
| JP | 62-173988 | 7/1987 |
| JP | 06-209594 | 7/1994 |
| JP | 2000-150193 | 5/2000 |
| JP | 2004-171867 | 6/2004 |

OTHER PUBLICATIONS

International Search Report, International Application No. PCT/JP2011/077599, Filed Nov. 30, 2011, Mailed Dec. 27, 2011, ISA/Japanese Patent Office.

\* cited by examiner

*Primary Examiner* — Anastasia Midkiff
(74) *Attorney, Agent, or Firm* — Brundidge & Stanger, P.C.

(57) ABSTRACT

In order to provide an X-ray imaging apparatus including a two-phase anode rotation mechanism driving circuit having a small and light configuration, one end of the main stator coil is connected to a three-phase full-bridge inverter circuit and the midpoint between two semiconductor switches of the first arm, one end of the auxiliary stator coil is connected to the midpoint between two semiconductor switches of the second arm, and the other ends of the main stator coil and the auxiliary stator coil are connected to the midpoint between two semiconductor switches of the third arm. The semiconductor switches are switched using an inverting circuit and a delay circuit so that a first AC voltage is supplied to the one end of the main stator coil and a second AC voltage, which is shifted in phase by 90° from the first AC voltage, is supplied to the one end of the auxiliary stator coil.

11 Claims, 5 Drawing Sheets

FIG.2
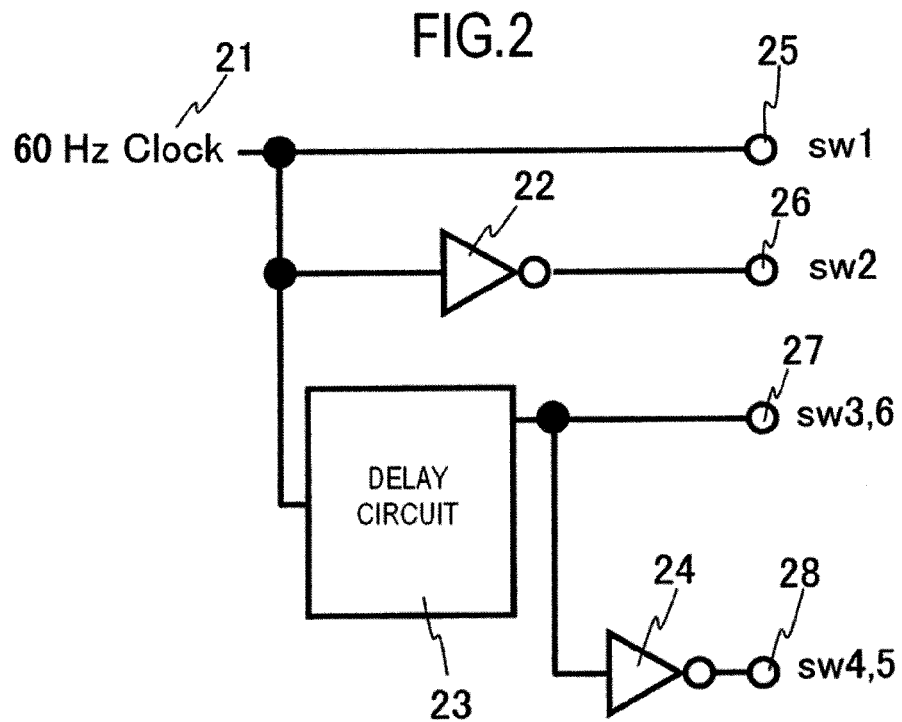
(a)
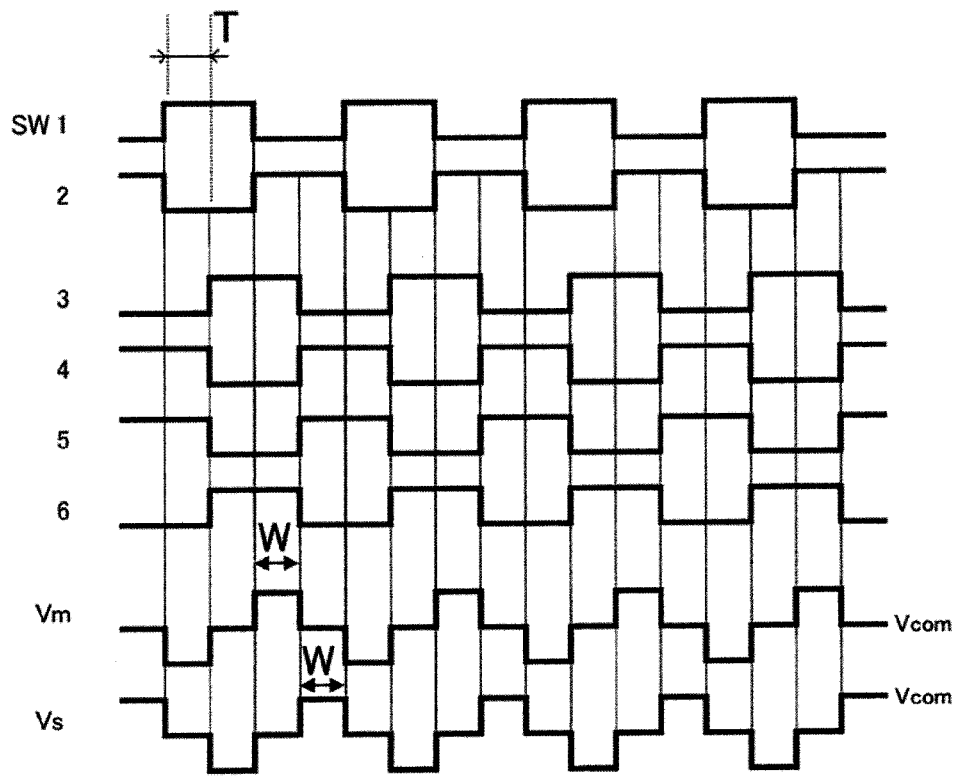
(b)

FIG.4
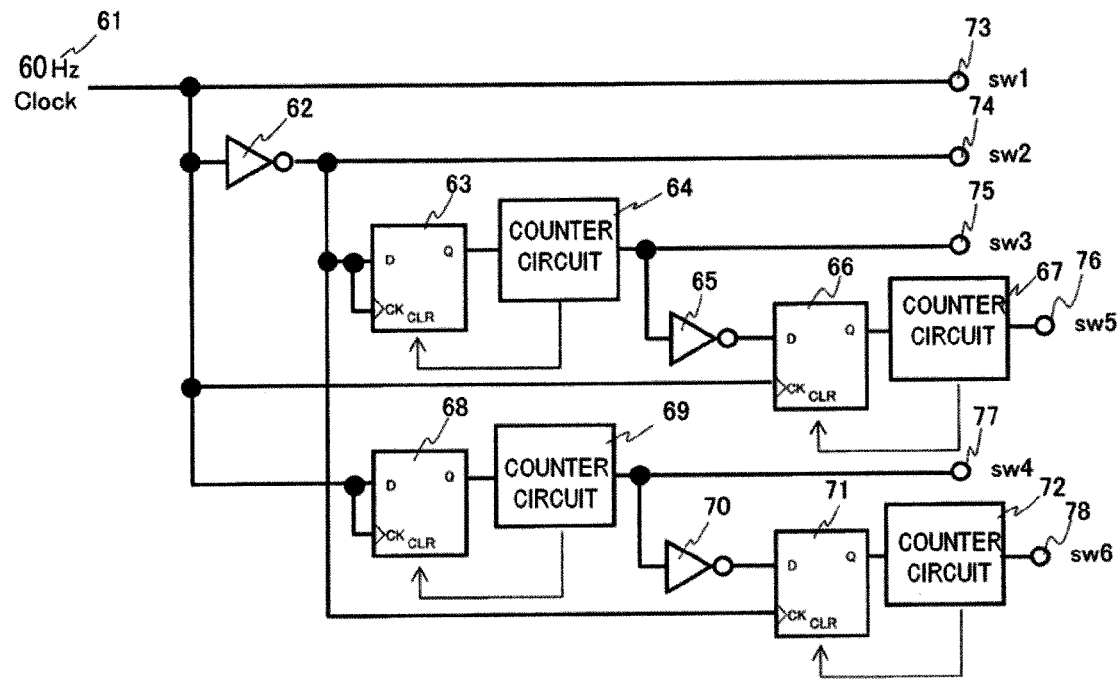
(a)
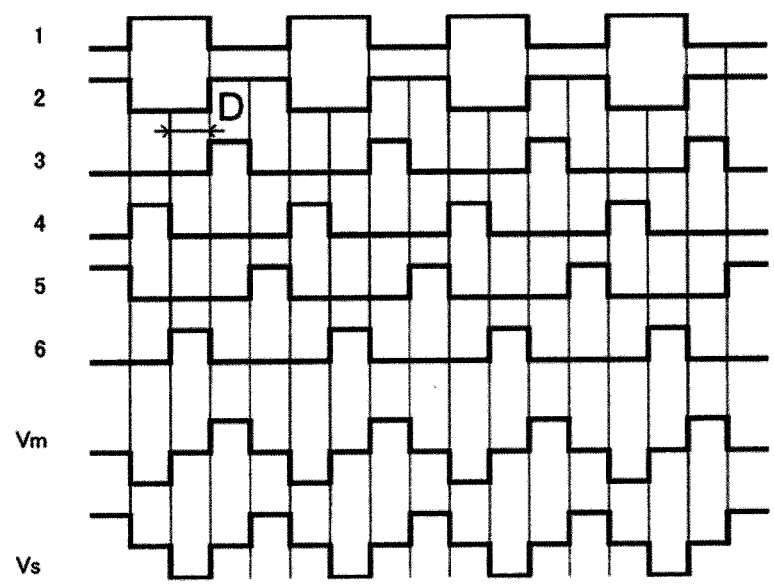
(b)

ANODE ROTATIONAL DRIVE DEVICE AND X-RAY IMAGING APPARATUS

TECHNICAL FIELD

The present invention relates to an anode rotational drive device of an X-ray tube used in an X-ray imaging apparatus and in particular, to an anode rotational drive device having a two-phase anode rotation mechanism.

BACKGROUND ART

A anode rotation type X-ray tube to increase the allowable load by moving the electron impact surface is very widely used in X-ray imaging apparatuses, such as an X-ray apparatus or an X-ray CT apparatus. As the anode rotation type X-ray tube, there are two types of a three-phase anode rotation mechanism used when high speed is required for starting and a two-phase anode rotation mechanism that is simple and inexpensive. The two-phase anode rotation mechanism is formed using two stator coils, and rotates a rotor coil by supplying the AC voltages, which are shifted in phase by 90° from each other, to the respective stator coils.

As AC voltage supply means, there is a circuit configured to include an inverter circuit section, in which two arm circuits each of which has two semiconductor switches connected in series are connected in parallel to each other, and a capacitor for shifting the phase by 90°, which is connected to one output side of the inverter circuit section. However, since a capacitor is used, it is difficult to accurately control the phase due to the influence of load change of the output destination, ambient temperature, or the like. On the other hand, as disclosed in PTL 1, there is a method of supplying the AC voltage to the two-phase anode rotation mechanism using an inverter circuit formed by connecting three arm circuits, each of which is formed by connecting two semiconductor switches in series, in parallel to each other. In this method, since it is not necessary to use a capacitor for the output of the inverter circuit section, it is possible to accurately control the phase.

CITATION LIST

Patent Literature

PTL 1: JP-A-2000-150193

SUMMARY OF INVENTION

Technical Problem

In PTL 1, however, since the AC voltages shifted in phase by 90° from each other are supplied to two respective stator coils using a vector converter that is formed using a microcomputer, the circuit configuration is complicated. Accordingly, the circuit size increases correspondingly.

It is an object of the present invention to provide an anode rotational drive device that drives an anode rotation mechanism accurately with a simple circuit configuration.

Solution to Problem

In order to achieve the object described above, according to a first aspect of the present invention, the following anode rotational drive device is provided. That is, an anode rotational drive device of an X-ray tube including a two-phase anode rotation mechanism including a main stator coil and an auxiliary stator coil, the anode rotational drive device includes: an inverter circuit section formed by connecting three arm circuits, each of which is formed by connecting two semiconductor switches in series, in parallel to each other; and a switching pattern signal generation section that generates a switching pattern signal to turn on and off each of the six semiconductor switches of the inverter circuit section at predetermined timing. Among the three arm circuits, one end of the main stator coil is connected to a midpoint between two semiconductor switches of a first arm, one end of the auxiliary stator coil is connected to a midpoint between two semiconductor switches of a second arm, and the other ends of the main stator coil and the auxiliary stator coil are connected to a midpoint between two semiconductor switches of a third arm. The switching pattern signal generation section includes first and second inverting circuits and a delay circuit and generates the switching pattern signal for supplying a first AC voltage to the one end of the main stator coil and a second AC voltage, which is shifted in phase by 90° from the first AC voltage, to the one end of the auxiliary stator coil.

Advantageous Effects of Invention

According to the present invention, it is possible to provide an anode rotational drive device that drives an anode rotation mechanism accurately with a simple circuit configuration.

BRIEF DESCRIPTION OF DRAWINGS

FIG. 2(a) is an explanatory view showing the circuit configuration of a switching pattern output unit 14 of the device shown in FIG. 1, and FIG. 2(b) is an explanatory view showing the waveform of the switching pattern signal.

FIG. 4(a) is an explanatory view showing the circuit configuration of a switching pattern output unit 14 of a second embodiment, and FIG. 4(b) is an explanatory view showing the waveform of the switching pattern signal.

DESCRIPTION OF EMBODIMENTS

Figure 1:
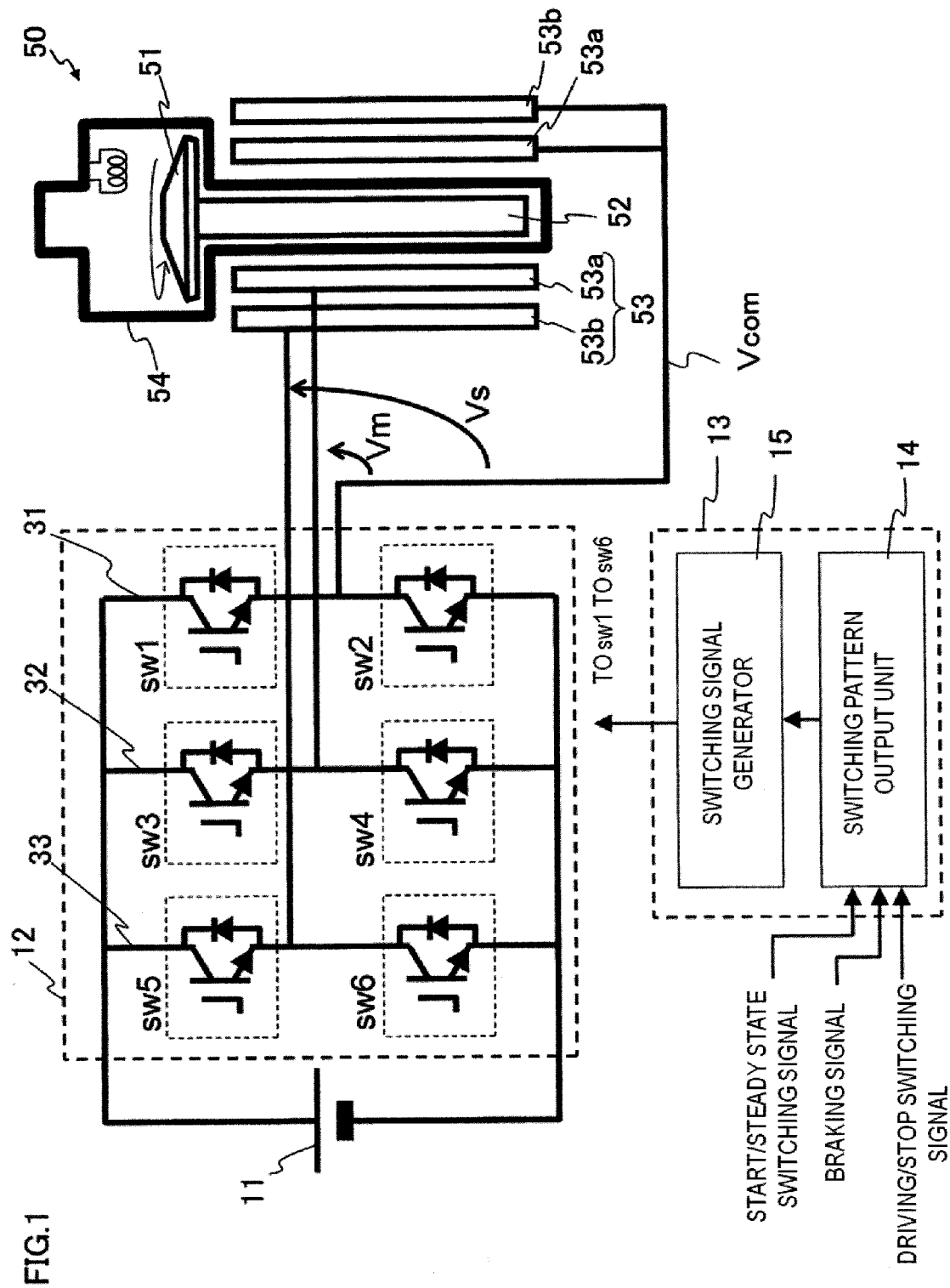
FIG. 1 is a block diagram of an anode rotational drive device of a first embodiment.

An embodiment of the present invention will be described.

An anode rotational drive device of the present invention is an anode rotational drive device of an X-ray tube including a two-phase anode rotation mechanism including a main stator coil and an auxiliary stator coil. The anode rotational drive device includes: an inverter circuit section formed by connecting three arm circuits, each of which is formed by connecting two semiconductor switches in series, in parallel to each other; and a switching pattern signal generation section that generates a switching pattern signal to turn on and off each of the six semiconductor switches of the inverter circuit section at predetermined timing. Among the three arm circuits, one end of the main stator coil is connected to a midpoint between two semiconductor switches of a first arm, one end of the auxiliary stator coil is connected to a midpoint between two semiconductor switches of a second arm, and the other ends of the main stator coil and the auxiliary stator coil are connected to a midpoint between two semiconductor switches of a third arm. The switching pattern signal generation section includes first and second inverting circuits and a delay circuit, and generates the switching pattern signal for supplying a first AC voltage to the one end of the main stator coil and a second AC voltage, which is shifted in phase by 90° from the first AC voltage, to the one end of the auxiliary stator coil.

In addition, the switching pattern signal generation section generates the switching pattern signal to generate two or more types of the first and second AC voltages of different output voltages.

In addition, the switching pattern signal generation section sets a clock signal having a predetermined frequency as a switching signal of a first semiconductor switch of the first arm, sets a signal obtained by inverting the clock signal with the first inverting circuit as a switching signal of a second semiconductor switch of the first arm, sets a signal obtained by delaying the clock signal by predetermined delay time T with the delay circuit as a switching signal of a first semiconductor switch of the second arm and a second semiconductor switch of the third arm, and sets a signal obtained by inverting an output of the delay circuit with the second inverting circuit as a switching signal of a second semiconductor switch of the second arm and a first semiconductor switch of the third arm.

In addition, the switching pattern signal generation section generates the switching pattern signal to generate two or more types of the first and second AC voltages of different output voltages by changing the delay time of the delay circuit in two or more manners.

In addition, an X-ray imaging apparatus of the present invention is an X-ray imaging apparatus including: a high voltage generator that supplies a high voltage to an X-ray tube including a two-phase anode rotation mechanism; and an anode rotational drive device that rotates an anode of the X-ray tube. As the anode rotational drive device, the above-described anode rotational drive device is used.

In addition, another embodiment of the present invention will be described.

An anode rotational drive device of the present invention is an anode rotational drive device of an X-ray tube including a two-phase anode rotation mechanism including a main stator coil and an auxiliary stator coil. The anode rotational drive device includes: an inverter circuit section formed by connecting three arm circuits, each of which is formed by connecting two semiconductor switches in series, in parallel to each other; and a switching pattern signal generation section that generates a switching pattern signal to turn on and off each of the six semiconductor switches of the inverter circuit section at predetermined timing. Among the three arm circuits, one end of the main stator coil is connected to a midpoint between two semiconductor switches of a first arm, one end of the auxiliary stator coil is connected to a midpoint between two semiconductor switches of a second arm, and the other ends of the main stator coil and the auxiliary stator coil are connected to a midpoint between two semiconductor switches of a third arm. The switching pattern signal generation section includes an inverting circuit and first to fourth ON signal output circuits, which output the ON signal only in a predetermined period from a predetermined timing, and generates the switching pattern signal for supplying a first AC voltage to the one end of the main stator coil and a second AC voltage, which is shifted in phase by 90° from the first AC voltage, to the one end of the auxiliary stator coil.

In addition, the switching pattern signal generation section generates the switching pattern signal to generate two or more types of the first and second AC voltages of different output voltages.

In addition, the switching pattern signal generation section sets a clock signal having a predetermined frequency as a switching signal of a first semiconductor switch of the first arm, sets a signal obtained by inverting the clock signal with the inverting circuit as a switching signal of a second semiconductor switch of the first arm, generates a signal that is in an ON state only in a predetermined period from ON timing of the switching signal of the second semiconductor switch of the first arm with the first ON signal output circuit and sets the signal as a switching signal of a first semiconductor switch of the second arm, generates a signal that is in an ON state only in a predetermined period from OFF timing of the switching signal of the first semiconductor switch of the second arm with the second ON signal output circuit and sets the signal as a switching signal of a first semiconductor switch of the third arm, generates a signal that is in an ON state only in a predetermined period from ON timing of the clock signal with the third ON signal output circuit and sets the signal as a switching signal of a second semiconductor switch of the second arm, and generates a signal that is in an ON state only in a predetermined period from OFF timing of the switching signal of the second semiconductor switch of the second arm with the fourth ON signal output circuit and sets the signal as a switching signal of a second semiconductor switch of the third arm.

In addition, the switching pattern signal generation section generates the switching pattern signal to generate two or more types of the first and second AC voltages of different output voltages by changing ON signal output time of the first to fourth ON signal output circuits in two or more manners.

In addition, each of the first to fourth ON signal output circuits is formed by a flip-flop circuit and a counter circuit.

In addition, an X-ray imaging apparatus of the present invention is an X-ray imaging apparatus including: a high voltage generator that supplies a high voltage to an X-ray tube including a two-phase anode rotation mechanism; and an anode rotational drive device that rotates an anode of the X-ray tube. As the anode rotational drive device, the above-described anode rotational drive device is used.

Next, embodiments of the present invention will be described with reference to the drawings.

First Embodiment

FIG. 1 shows an anode rotational drive device of an X-ray tube of a first embodiment of the present invention. This anode rotational drive device is a device that supplies an AC voltage Vm, Vs, and Vcom to an X-ray tube 50 that is mounted in an X-ray imaging apparatus and has a two-phase anode rotation mechanism.

The X-ray tube 50 includes an umbrella-shaped anode target 51, a rotor coil 52 connected to the anode target 51, a stator coil 53 disposed around the rotor coil 52, and an X-ray tube vessel 54. The anode target 51 and the rotor coil 52 are disposed inside the X-ray tube vessel 54, and the stator coil 53 is disposed outside the X-ray tube vessel 54. The stator coil 53 includes a main coil 53a and an auxiliary coil 53b. When the AC voltage Vm is supplied to one end of the main coil 53a, the AC voltage Vs phase shifted by 90° from Vm is supplied to one end of the auxiliary coil 53b, and the common voltage Vcom is supplied to the other end (common terminal) of the main coil 53a and the auxiliary coil 53b, the stator coil 53 generates a rotating magnetic field, and the rotor coil in the X-ray tube vessel 54 is rotated by the rotating magnetic field. As a result, the anode rotates.

The anode rotational drive device includes a DC power supply 11, a three-phase full-bridge inverter circuit 12, and a control circuit 13. The three-phase full-bridge inverter circuit 12 is a three-arm circuit formed of six semiconductor switches 1 to 6. Each of the semiconductor switches 1 to 6 is formed by connecting a diode in anti-parallel to an insulated gate bipolar transistor (IGBT). The three-phase full-bridge inverter circuit 12 is formed by connecting the three arms, each of which has a configuration in which two semiconductor switches are connected in series, in parallel to each other.

The common terminal of the main coil 53*a* and the auxiliary coil 53*b* is connected between the semiconductor switches 1 and 2 (to the midpoint between the semiconductor switches 1 and 2) of a first arm 31 configured to include the semiconductor switches 1 and 2. One end of the main coil 53*a* is connected to the midpoint between the semiconductor switches 3 and 4 of a second arm 32 configured to include the semiconductor switches 3 and 4. One end of the auxiliary coil 53*b* is connected to the midpoint between the semiconductor switches 5 and 6 of a third arm 33 configured to include the semiconductor switches 5 and 6.

The control circuit includes a switching pattern output unit 14 and a switching signal generator 15. The switching pattern output unit 14 includes a circuit that outputs four types of switching pattern signals set in advance. The switching pattern output unit 14 receives a switching signal to select start/steady state of anode rotation, a signal instructing the output of a braking signal, and a switching signal to select driving/stop from an inverter driving circuit (not shown) of an X-ray high voltage device mounted in the X-ray imaging apparatus, selects and generates a switching pattern signal corresponding to the received signal from four types of switching pattern signals, and outputs it to the switching signal generator 15. The switching signal generator 15 outputs an ON/OFF gate signal to each of the semiconductor switches 1 to 6 of the three-phase full-bridge inverter circuit 12 at the timing corresponding to the switching pattern signal of the switching pattern output unit 14, thereby realizing switching.

The switching pattern output unit 14 outputs one of four types of signals of the switching pattern signal for starting, the switching pattern signal for steady state, the switching pattern signal for braking, and the switching pattern signal for stop according to the signal from the inverter driving circuit (not shown) of the X-ray high voltage device.

As a circuit for generating the switching pattern signal for starting and the switching pattern signal for steady state, the switching pattern output unit 14 includes a circuit shown in FIG. 2(*a*).

The switching pattern for starting is a switching pattern for outputting an AC high voltage (at the time of high-speed rotation) of, for example, 500 V and 60 Hz from the three-phase full-bridge inverter circuit 12 to the stator coil 53. This generates large starting torque with a high voltage, thereby rotating and starting the rotor coil 52 and the anode target 51.

The switching pattern for steady state is a switching pattern for outputting an AC low voltage (at the time of high-speed rotation) of, for example, 100 V and 60 Hz from the three-phase full-bridge inverter circuit 12 to the stator coil 53. This makes the rotor coil 52 and the anode target 51 operate in a steady state with low power and low loss.

In addition, the switching pattern signal for braking is a switching pattern signal for outputting a predetermined DC voltage (for example, 70 V) from the three-phase full-bridge inverter circuit 12 to the stator coil 53. This applies DC braking to the rotor coil 52 of the anode rotation mechanism to stop it. As the switching pattern signal for stop, a switching pattern signal for outputting a voltage of 0 V or no voltage from the three-phase full-bridge inverter circuit 12 to the stator coil 53 is output. A circuit for outputting the switching pattern signal for braking and the switching pattern signal for stop is provided in the switching pattern output unit 14 separately from the circuit shown in FIG. 2(*a*). Since this circuit has a known configuration, explanation thereof will be omitted herein.

The circuit of FIG. 2(*a*) for generating the switching pattern signal for starting and the switching pattern signal for steady state will be described. As shown in FIG. 2(*a*), the switching pattern output unit 14 includes a clock generation section 21, an inverting circuit 22 that inverts the clock signal of the clock generation section 21, a delay circuit 23 that delays the clock signal by a predetermined time, an inverting circuit 24 that inverts the output of the delay circuit 23, and four output terminals 25 to 28. The output terminal 25 is a terminal to output the clock signal of the clock generation section 21 as it is, and this output becomes a switching signal of the semiconductor switch 1 as shown in FIG. 2(*b*). The output terminal 26 outputs a signal obtained by inverting the clock signal with the inverting circuit 24, and this signal becomes a switching signal of the semiconductor switch 2. The output terminal 27 outputs a signal obtained by delaying the clock signal by a delay time T with the delay circuit 23, and this signal becomes switching signals of the semiconductor switches 3 and 6. The output terminal 28 outputs a signal obtained by inverting the output of the delay circuit 23 with the inverting circuit 24, and this signal becomes switching signals of the semiconductor switches 4 and 5. Then, as shown in FIG. 2(*b*), switching pattern signals indicating the timing to switch the six semiconductor switches 1 to 6 are generated by the switching pattern output unit 14.

By the switching pattern signals shown in FIG. 2(*b*), the AC voltage Vm supplied to the main coil 53*a* becomes a positive voltage with respect to Vcom in a period for which the semiconductor switches 2 and 3 are simultaneously turned on, and becomes a negative voltage with respect to Vcom in a period for which the semiconductor switches 1 and 4 are simultaneously turned on. The period of the AC voltage Vm is equal to the period of the clock signal. On the other hand, the AC voltage Vs supplied to the auxiliary coil 53*b* becomes a positive voltage with respect to Vcom in a period for which the semiconductor switches 2 and 5 are simultaneously turned on, and becomes a negative voltage with respect to Vcom in a period for which the semiconductor switches 1 and 4 are simultaneously turned on. The period of the AC voltage Vs is equal to the period of the clock signal. Since the AC voltage Vm and the AC voltage Vs are shifted in phase by 90° from each other as is clear from FIG. 2(*b*), the stator coil 53 can generate a rotating magnetic field to rotate the rotor coil 52.

In addition, by controlling the delay time T of the delay circuit 23, a pulse width W, in which the AC voltage Vm supplied to the main coil 53*a* is a positive voltage, and a pulse width W, in which the AC voltage Vs supplied to the auxiliary coil 53*b* is a positive voltage, can be controlled. By adjusting the pulse width W, output voltages of the AC voltages Vm and Vs can be adjusted.

The delay circuit 23 outputs a switching pattern signal for starting for outputting an AC high voltage of, for example, 500 V and 60 Hz by setting the delay time T to delay time for starting T1 set in advance. In addition, the delay circuit 23 outputs a switching pattern signal for steady state for outputting an AC low voltage of, for example, 100 V and 60 Hz by setting the delay time T to delay time for steady state T2 set in advance.

On the other hand, although not shown in the drawings, the switching pattern signal for braking is a switching pattern for periodically turning on and off arbitrary semiconductor switches (for example, the semiconductor switches 2 and 4) of the three-phase full-bridge inverter circuit 12. By adjusting the ratio of the ON time and the OFF time to the ratio set in advance, the output of the three-phase full-bridge inverter circuit 12 can be set to a DC voltage (for example, 70 V). In this manner, DC braking is applied to the rotor coil 52 of the anode rotation mechanism to stop it. In addition, the switching pattern signal for stop is a switching pattern for turning off all the semiconductor switches 1 to 6.

Figure 3:
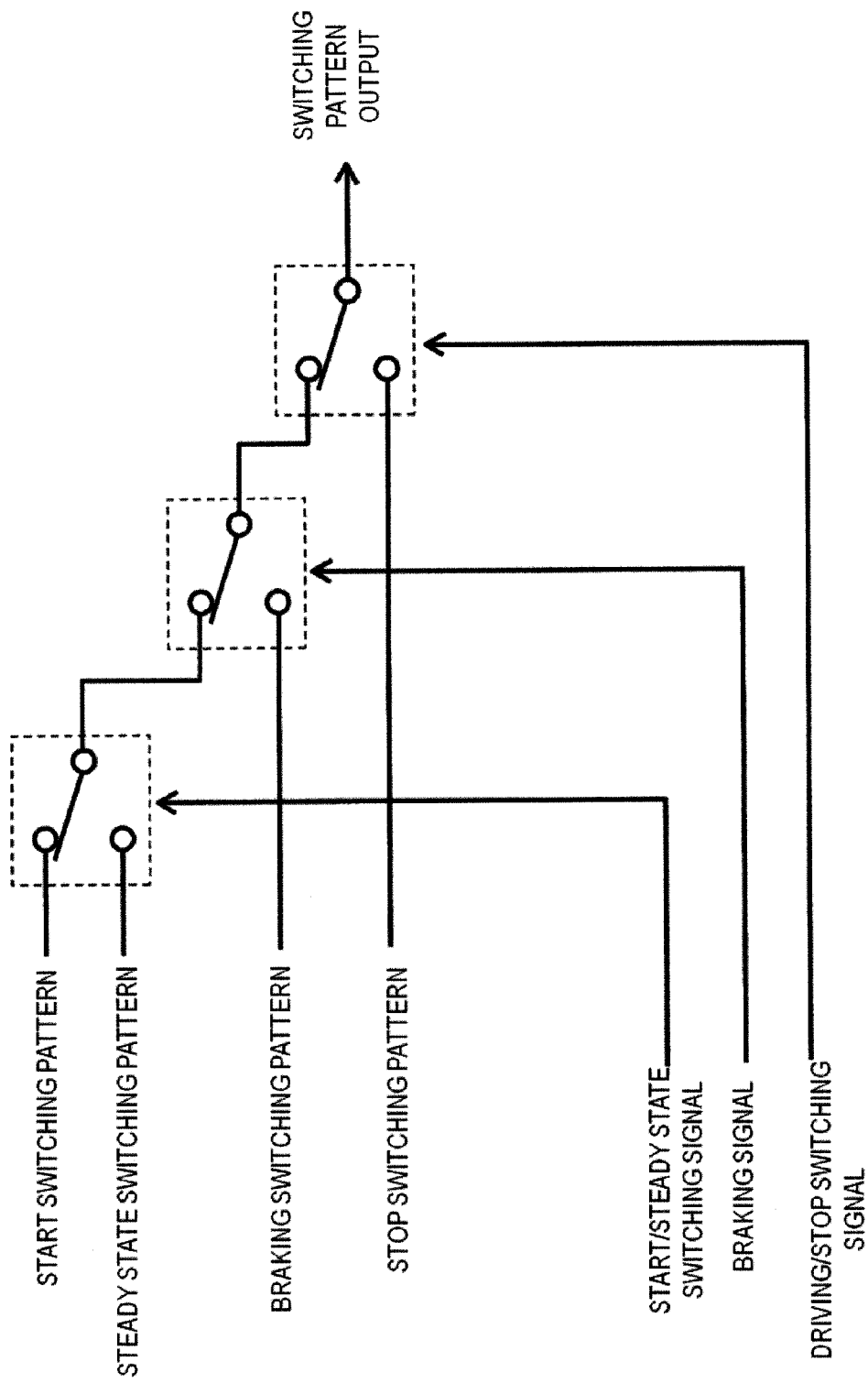
FIG. 3 is an explanatory view showing the operation of the switching pattern output unit 14 of the device shown in FIG. 1.

Next, the operation of the anode rotational drive device of the X-ray tube of the present embodiment configured as described above will be described with reference to FIG. 3. FIG. 3 is an explanatory view showing the operation of the switching pattern output unit 14 that selects and outputs four switching patterns of start/steady state/braking/stop according to the signal from the inverter driving circuit (not shown) of the X-ray high voltage device. The switching pattern output unit 14 selects and outputs four switching patterns in order of priority of stop>braking>steady state>start.

That is, the switching pattern output unit 14 receives four signals (high speed/low speed switching signal, start/steady state switching signal, braking signal, driving/stop switching signal) from the inverter driving circuit of the X-ray high voltage device through an input/output interface.

The inverter driving circuit of the X-ray high voltage device outputs a high speed/low speed switching signal to select the rotation speed of the anode according to the magnitude of the load power applied to the X-ray tube 50. A high-speed switching signal is set when the load power applied to the X-ray tube is large, and a low-speed switching signal is set when the load power applied to the X-ray tube is small. The following explanation will be given on the assumption that the high-speed switching signal is set.

The inverter driving circuit of the X-ray high voltage device outputs a start/steady state switching signal indicating whether the rotation of the anode target 51 is starting or has reached a steady state rotation speed which is a set rotation speed determined by the frequency of the two-phase AC voltage. When the received start/steady state switching signal is set as start, the switching pattern output unit 14 sets the delay time for starting T1 in the delay circuit of the circuit shown in FIG. 2(a) and outputs the switching pattern for starting shown in FIG. 2(b). Due to the switching signal generator 15 turning on and off the semiconductor switches 1 to 6 of the three-phase full-bridge inverter circuit 12 according to the switching pattern signal for starting, two-phase AC voltages Vm and Vs of, for example, 500 V and 60 Hz are supplied to the stator coil 53 of the two-phase anode rotation mechanism. On the other hand, when the received start/steady state switching signal is set as steady state, the switching pattern output unit 14 sets a delay time for steady state T2 in the delay circuit of the circuit shown in FIG. 2(a) and outputs the switching pattern signal for steady state shown in FIG. 2(b). Due to the switching signal generator 15 turning on and off the semiconductor switches 1 to 6 of the three-phase full-bridge inverter circuit 12 according to the switching pattern signal for steady state, two-phase AC voltages Vm and Vs of, for example, 100 V and 60 Hz are supplied to the stator coil 53 of the two-phase anode rotation mechanism.

When the X-ray exposure ends and a braking signal for stopping the anode rotation is received from the inverter driving circuit of the X-ray high voltage device, the switching pattern output unit 14 outputs a switching pattern signal for braking. Due to the switching signal generator 15 turning on and off the semiconductor switches 2 to 4 of the three-phase full-bridge inverter circuit according to the switching pattern signal for braking, a DC voltage of, for example, about 70 V is supplied to an arbitrary coil of the stator coil 53 of the two-phase anode rotation mechanism. Then, DC braking is applied to the rotor coil 52 and the anode target 51 to stop them.

In addition, the inverter driving circuit of the X-ray high voltage device outputs a driving/stop switching signal to perform switching between the driving and the stop of anode rotation according to whether to perform X-ray imaging. When this switching signal is set as stop, the switching pattern output unit 14 outputs a switching pattern signal for stop. Then, the switching signal generator 15 turns off the semiconductor switches 1 to 6 of the three-phase full-bridge inverter circuit according to the switching pattern signal for stop, and the three-phase full-bridge inverter circuit outputs a voltage of 0 V to the anode rotation mechanism or outputs no voltage. When the driving/stop switching signal is set as driving, the switching pattern output unit 14 outputs the above-described switching pattern signal for starting or steady state or the above-described switching pattern signal for braking according to other switching signals.

As shown in FIG. 3, the switching signal generator 15 generates corresponding switching pattern signals in order of priority of driving/stop switching signal>braking signal>start/stop switching signal, thereby controlling the operation of the anode rotation mechanism.

Thus, in the first embodiment, the two-phase anode rotational drive device can be formed using a general-purpose three-phase full-bridge inverter circuit and the switching pattern output unit 14 having a simple configuration. Therefore, it is possible to provide a small, light, and inexpensive device.

In addition, in the first embodiment, Vm and Vs shifted in phase by 90° from each other can be accurately generated by the simple circuit configuration shown in FIG. 2(a). Therefore, it is possible to provide an anode rotational drive device that is small and light and that can generate sufficient torque to rotate the anode.

Second Embodiment

In an anode rotational drive device of a second embodiment, a circuit shown in FIG. 4(a) is used as a circuit for generating the switching pattern signal for starting and the switching pattern signal for steady state of the switching pattern output unit 14. Accordingly, switching pattern signals shown in FIG. 4(b) are generated.

As shown in FIG. 4(a), the switching pattern output unit 14 includes a clock generation section 61, inverting circuits 62, 65, and 70, counter circuits 64, 67, 69, 72, flip-flop circuits 63, 66, 68, and 71, and six output terminals 73 to 78.

The output terminal 73 is a terminal to output the clock signal of the clock generation section 61 as it is, and this output becomes a switching signal of the semiconductor switch 1 as shown in FIG. 4(b). The output terminal 74 outputs a signal obtained by inverting the clock signal with the inverting circuit 62, and this signal becomes a switching signal of the semiconductor switch 2. In addition, the counter circuit 64 starts counting from the rising edge of the switching signal of the semiconductor switch 2 and resets the flip-flop circuit 63 when the counting value reaches a predetermined count. As a result, a signal that is in an ON state only in a period from the rising edge of the switching signal of the semiconductor switch 2 to the predetermined count is output from the output terminal 75 as a switching signal of the semiconductor switch 3.

In addition, the inverting circuit 65 inverts the switching signal of the semiconductor switch 3, and the counter circuit 67 starts counting from the rising edge of the inverted signal. The flip-flop circuit 66 is reset when the counting value reaches a predetermined count, and the signal is output from the output terminal 76 as a switching signal of the semiconductor switch 5. As a result, a signal that is in an ON state only in a period from the falling edge of the switching signal of the semiconductor switch 3 to the predetermined count is output from the output terminal 76 as a switching signal of the semiconductor switch 5.

The counter circuit 69 starts counting from the rising edge of the switching signal (clock signal) of the semiconductor switch 1 and resets the flip-flop circuit 68 when the counting value reaches a predetermined count. As a result, a signal that is in an ON state only in a period from the rising edge of the switching signal of the semiconductor switch 1 to the predetermined count is output from the output terminal 77 as a switching signal of the semiconductor switch 4.

The inverting circuit 70 inverts the switching signal of the semiconductor switch 4, and the counter circuit 72 starts counting from the rising edge of the inverted signal. The flip-flop circuit 71 is reset when the counting value reaches a predetermined count, and the signal is output from the output terminal 78 as a switching signal of the semiconductor switch 6. As a result, a signal that is in an ON state only in a period from the falling edge of the switching signal of the semiconductor switch 4 to the predetermined count is output from the output terminal 78 as a switching signal of the semiconductor switch 6.

By the switching pattern signals shown in FIG. 4(b), the AC voltage Vm supplied to the main coil 53a becomes a positive voltage with respect to Vcom in a period for which the semiconductor switches 2 and 3 are simultaneously turned on, and becomes a negative voltage with respect to Vcom in a period for which the semiconductor switches 1 and 4 are simultaneously turned on. The period of the AC voltage Vm is equal to the period of the clock signal. On the other hand, the AC voltage Vs supplied to the auxiliary coil 53b becomes a positive voltage with respect to Vcom in a period for which the semiconductor switches 2 and 5 are simultaneously turned on, and becomes a negative voltage with respect to Vcom in a period for which the semiconductor switches 1 and 4 are simultaneously turned on. The period of the AC voltage Vs is equal to the period of the clock signal. Since the AC voltage Vm and the AC voltage Vs are shifted in phase by 90° from each other as is clear from FIG. 4(b), the stator coil 53 can generate a rotating magnetic field to rotate the rotor coil 52.

In addition, since the pulse width D shown in FIG. 4(b) can be changed by changing the number of counts set in the counter circuits 64, 67, 69, and 72, the output voltages of the AC voltages Vm and Vs can be adjusted.

Thus, the AC voltage that is output from the three-phase full-bridge inverter circuit 12 to the stator coil 53 can be set to any value by the switching pattern signal for starting and the switching pattern signal for steady state. Therefore, even if the magnitude of torque required at the time of starting differs depending on the type of the X-ray tube 50, it is possible to set the required AC voltage by adjusting the pulse width D corresponding to it. As a result, since it is not necessary to supply the unnecessary high voltage, it is possible to reduce the power loss. In addition, also in the steady state, minimum power required for rotation can be supplied according to the type of the X-ray tube 50. As a result, it is possible to reduce the power loss. In this manner, since the rotary driving of the anode can be efficiently performed with low power and it is possible to prevent the generation of heat due to power loss, the cooling equipment can be simplified. Accordingly, since it can operate with small power as a portable X-ray imaging apparatus, it is possible to provide an apparatus with small cooling equipment.

Since other configurations, operations, and effects are the same as those in the first embodiment, explanation thereof will be omitted.

In addition, although the example of generating different switching pattern signals at the time of starting and steady state has been described in the first and second embodiments, the same AC voltage may be set at the time of starting and steady state depending on the type of the X-ray tube 50. In this case, it is possible to use the same switching pattern at the time of starting and steady state.

As described above, in the anode rotational drive devices of the first and second embodiments of the present invention, the switching pattern output unit 14 can be formed with a very simple digital circuit. Therefore, there is an advantage in that the anode rotational drive device of the X-ray tube can be made small and light.

Third Embodiment

As a third embodiment, an X-ray high voltage device using the anode rotational drive devices of the first and second embodiments will be described with reference to FIG. 5.

Figure 5:
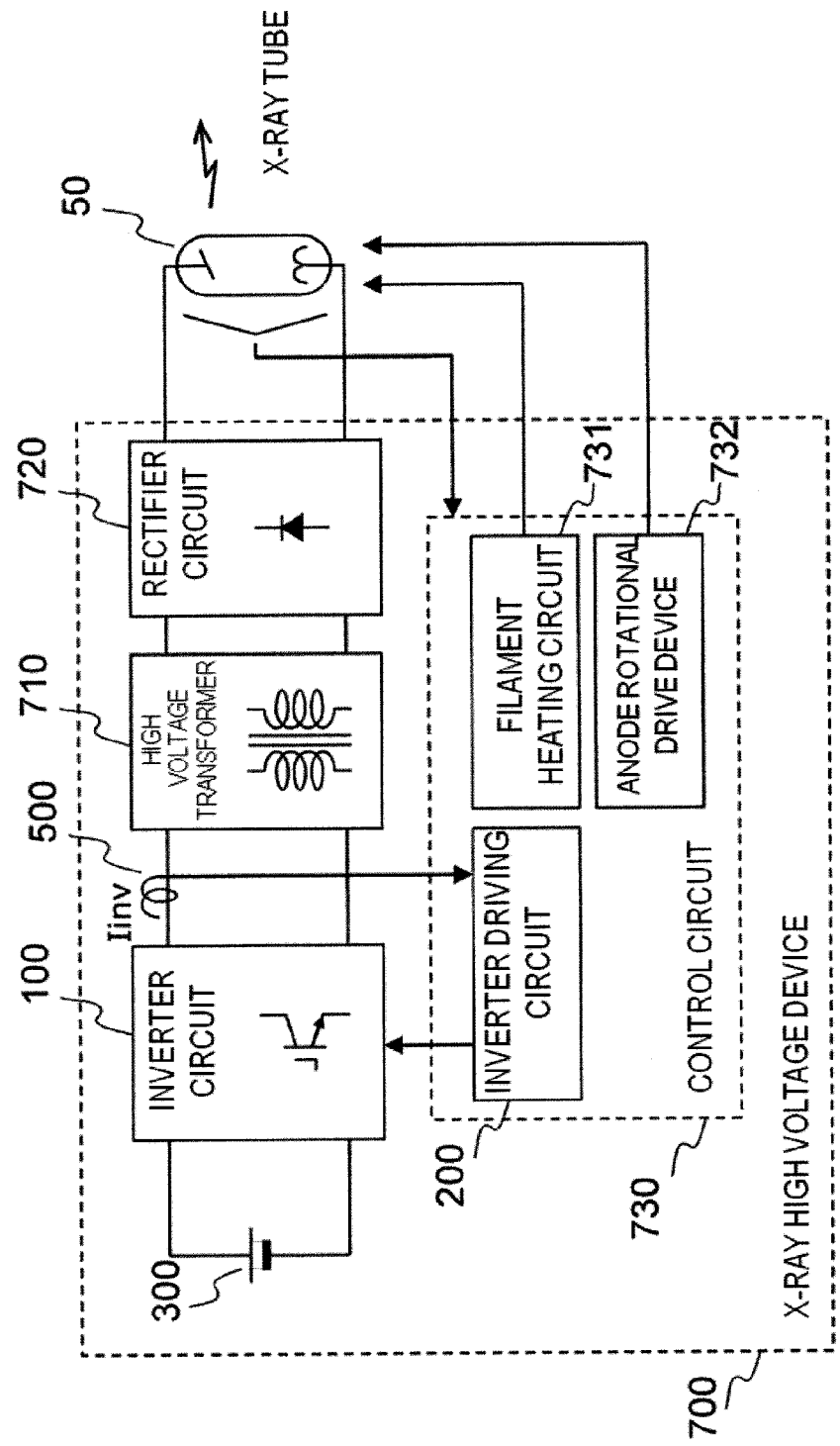
FIG. 5 is a block diagram of an X-ray high voltage device of a third embodiment.

As shown in FIG. 5, an X-ray high voltage device 700 includes a phase shift type inverter circuit section 100, a DC power supply 300, a control circuit 730, a current detector 500, a high voltage transformer 710, and a rectifier circuit 720, and the rectifier circuit 720 is connected to the X-ray tube 50. The control circuit 730 includes an inverter driving circuit section 200, a filament heating circuit 731, and an anode rotational drive device 732. As the anode rotational drive device 732, the device of the first or second embodiment is used.

The DC power supply 300 is connected to the phase shift type inverter circuit section 100. The high-frequency voltage which is an output of the inverter circuit section 100 is converted into a high voltage by the high voltage transformer 710, and is rectified by the rectifier circuit 720 to become a DC voltage. The DC high voltage output from the rectifier circuit 72 is applied to the X-ray tube 50 and becomes X-rays to irradiate an object. Each of the voltage and the current applied to the X-ray tube 50 is input to the control circuit 730 in the X-ray high voltage device 700 as a detection value. A current sensor 500 that detects the output current of the phase shift type inverter circuit section 100 is connected to the inverter driving circuit section 200 of the control circuit 730 in order to drive the semiconductor switch in the phase shift type inverter circuit section 100.

The filament heating circuit 731 heats the filament of the X-ray tube 50. Then, in the X-ray tube 50, thermal electrons are emitted from the heated filament and collide with the anode target 51 to generate heat and X-rays. The anode target 51 with which thermal electrons collide is rotated by the anode rotational drive device 732 of the first and second embodiments.

In addition, by using the X-ray high voltage device of the present embodiment, it is possible to form an X-ray imaging apparatus or an X-ray CT apparatus. Since each device of the first and second embodiments is used as the anode rotational drive device 732, anode rotation can be performed with good energy efficiency by the small and light anode rotational drive device. Therefore, it is possible to provide an X-ray imaging apparatus or an X-ray CT apparatus that is small and light.

REFERENCE SIGNS LIST 1 to 6: semiconductor switch
11: DC power supply
12: three-phase full-bridge inverter circuit
13: control circuit
14: switching pattern output unit
15: switching signal generator
21: clock generation section
22, 24: inverting circuit
23: delay circuit
25 to 28: output terminal
31 to 33: arm
50: X-ray tube
51: anode target
52: rotor coil
53: stator coil
53a: main coil
53b: auxiliary coil
54: X-ray tube vessel
62, 65, 70: inverting circuit
63, 66, 68, 71: flip-flop
64, 67, 69, 72: counter circuit
73 to 78: output terminal
100: inverter circuit
200: inverter circuit driving section
700: X-ray high voltage device
710: high voltage transformer
720: rectifier circuit
730: control circuit
731: filament heating circuit
732: anode rotational drive device

The invention claimed is:

1. An anode rotational drive device of an X-ray tube including a two-phase anode rotation mechanism including a main stator coil and an auxiliary stator coil, the anode rotational drive device comprising:
an inverter circuit section formed by connecting three arm circuits, each of which is formed by connecting two semiconductor switches in series, in parallel to each other; and
a switching pattern signal generation section that generates a switching pattern signal to turn on and off each of the six semiconductor switches of the inverter circuit section at predetermined timing,
wherein, among the three arm circuits, one end of the main stator coil is connected to a midpoint between two semiconductor switches of a first arm, one end of the auxiliary stator coil is connected to a midpoint between two semiconductor switches of a second arm, and the other ends of the main stator coil and the auxiliary stator coil are connected to a midpoint between two semiconductor switches of a third arm, and
the switching pattern signal generation section includes first and second inverting circuits and a delay circuit, and generates the switching pattern signal for supplying a first AC voltage to the one end of the main stator coil and a second AC voltage, which is shifted in phase by 90° from the first AC voltage, to the one end of the auxiliary stator coil.

2. The anode rotational drive device according to claim 1, wherein the switching pattern signal generation section generates the switching pattern signal to generate two or more types of the first and second AC voltages of different output voltages.

3. The anode rotational drive device according to claim 1, wherein the switching pattern signal generation section sets a clock signal having a predetermined frequency as a switching signal of a first semiconductor switch of the first arm, sets a signal obtained by inverting the clock signal with the first inverting circuit as a switching signal of a second semiconductor switch of the first arm, sets a signal obtained by delaying the clock signal by predetermined delay time T with the delay circuit as a switching signal of a first semiconductor switch of the second arm and a second semiconductor switch of the third arm, and sets a signal obtained by inverting an output of the delay circuit with the second inverting circuit as a switching signal of a second semiconductor switch of the second arm and a first semiconductor switch of the third arm.

4. The anode rotational drive device according to claim 1, wherein the switching pattern signal generation section generates the switching pattern signal to generate two or more types of the first and second AC voltages of different output voltages by changing the delay time of the delay circuit in two or more manners.

5. An X-ray imaging apparatus comprising:
a high voltage generator that supplies a high voltage to an X-ray tube including a two-phase anode rotation mechanism; and
an anode rotational drive device that rotates an anode of the X-ray tube,
wherein, as the anode rotational drive device, the anode rotational drive device according to claim 1 is used.

6. An anode rotational drive device of an X-ray tube including a two-phase anode rotation mechanism including a main stator coil and an auxiliary stator coil, the anode rotational drive device comprising:
an inverter circuit section formed by connecting three arm circuits, each of which is formed by connecting two semiconductor switches in series, in parallel to each other; and
a switching pattern signal generation section that generates a switching pattern signal to turn on and off each of the six semiconductor switches of the inverter circuit section at predetermined timing,
wherein, among the three arm circuits, one end of the main stator coil is connected to a midpoint between two semiconductor switches of a first arm, one end of the auxiliary stator coil is connected to a midpoint between two semiconductor switches of a second arm, and the other ends of the main stator coil and the auxiliary stator coil are connected to a midpoint between two semiconductor switches of a third arm, and
the switching pattern signal generation section includes an inverting circuit and first to fourth ON signal output circuits, which output the ON signal only in a predetermined period from predetermined timing, and generates the switching pattern signal for supplying a first AC voltage to the one end of the main stator coil and a second AC voltage, which is shifted in phase by 90° from the first AC voltage, to the one end of the auxiliary stator coil.

7. The anode rotational drive device according to claim 6, wherein the switching pattern signal generation section generates the switching pattern signal to generate two or more types of the first and second AC voltages of different output voltages.

8. The anode rotational drive device according to claim 6, wherein the switching pattern signal generation section sets a clock signal having a predetermined frequency as a switching signal of a first semiconductor switch of the first arm, sets a signal obtained by inverting the clock signal with the inverting circuit as a switching signal of a second semiconductor switch of the first arm, generates a signal that is in an ON state only in a predetermined period from ON timing of the switching signal of the second semiconductor switch of the first arm with the first ON signal output circuit and sets the signal as a switching signal of a first semiconductor switch of the second arm, generates a signal that is in an ON state only in a predetermined period from OFF timing of the switching signal of the first semiconductor switch of the second arm with the second ON signal output circuit and sets the signal as a switching signal of a first semiconductor switch of the third arm, generates a signal that is in an ON state only in a predetermined period from ON timing of the clock signal with the third ON signal output circuit and sets the signal as a switching signal of a second semiconductor switch of the second arm, and generates a signal that is in an ON state only in a predetermined period from OFF timing of the switching signal of the second semiconductor switch of the second arm with the fourth ON signal output circuit and sets the signal as a switching signal of a second semiconductor switch of the third arm.

9. The anode rotational drive device according to claim 6, wherein the switching pattern signal generation section generates the switching pattern signal to generate two or more types of the first and second AC voltages of different output voltages by changing ON signal output time of the first to fourth ON signal output circuits in two or more manners.

10. The anode rotational drive device according to claim 6, wherein each of the first to fourth ON signal output circuits is formed by a flip-flop circuit and a counter circuit.

11. An X-ray imaging apparatus comprising:
a high voltage generator that supplies a high voltage to an X-ray tube including a two-phase anode rotation mechanism; and
an anode rotational drive device that rotates an anode of the X-ray tube,
wherein, as the anode rotational drive device, the anode rotational drive device according to claim 6 is used.

* * * * *